(12) United States Patent
Okita (10) Patent No.: US 11,341,151 B2
(45) Date of Patent: May 24, 2022

(54) INFORMATION COLLECTION DEVICE AND INFORMATION COLLECTION METHOD

(71) Applicant: FANUC CORPORATION, Yamanashi (JP)

(72) Inventor: Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 184 days.

(21) Appl. No.: 16/854,404

(22) Filed: Apr. 21, 2020

(65) Prior Publication Data

US 2020/0249635 A1     Aug. 6, 2020

Related U.S. Application Data

(62) Division of application No. 15/982,515, filed on May 17, 2018, now Pat. No. 10,838,371.

(30) Foreign Application Priority Data

Jul. 18, 2017   (JP) .................................. 2017-138948

(51) Int. Cl.
*G06F 16/248*     (2019.01)
*G05B 23/02*      (2006.01)
(Continued)

(52) U.S. Cl.
CPC .............. *G06F 16/248* (2019.01); *G05B 1/03* (2013.01); *G05B 19/4065* (2013.01);
(Continued)

(58) Field of Classification Search
CPC .. G05B 1/03; G05B 19/4065; G05B 19/4069; G05B 21/02; G05B 23/02;
(Continued)

(56) References Cited

U.S. PATENT DOCUMENTS 4,254,690 A   3/1981   Tlaker
4,855,925 A   8/1989   Bhateja
(Continued)

FOREIGN PATENT DOCUMENTS

CN   103576607   2/2014
CN   106406228   2/2017
(Continued)

OTHER PUBLICATIONS

Office Action dated May 6, 2020 in U.S. Appl. No. 15/982,515.
(Continued)

*Primary Examiner* — Crystal J Barnes-Bullock
(74) *Attorney, Agent, or Firm* — Wenderoth, Lind & Ponack, L.L.P.

(57) ABSTRACT

Information is collected from a management target device having a drive unit such as a machine tool, and this collected information is more practically used. An information collection device includes a collection unit that collects, from management target devices having a drive unit, operating state information which is information indicating an operating state of the management target device while operating accompanying movement of the drive unit; and a comparison unit that extracts a plurality of sets of information matching in a predetermined condition from the operating state information thus collected, and outputs a comparison result of the plurality of sets of information thus extracted.

9 Claims, 5 Drawing Sheets

(51) Int. Cl.
  *G05B 19/4065* (2006.01)
  *G05B 19/4069* (2006.01)
  *G06F 16/21* (2019.01)
  *G06F 16/2458* (2019.01)
  *G05B 1/03* (2006.01)
  *G05B 21/02* (2006.01)

(52) U.S. Cl.
  CPC ......... *G05B 19/4069* (2013.01); *G05B 21/02* (2013.01); *G05B 23/02* (2013.01); *G05B 23/0221* (2013.01); *G06F 16/211* (2019.01); *G06F 16/2474* (2019.01); *G05B 2219/37242* (2013.01); *G05B 2219/37258* (2013.01); *G05B 2219/49062* (2013.01); *G05B 2219/49098* (2013.01); *G05B 2219/50197* (2013.01)

(58) Field of Classification Search
  CPC ...... G05B 23/0221; G05B 2219/37242; G05B 2219/37258; G05B 2219/49062; G05B 2219/49098; G05B 2219/50197; B23Q 15/12; G06F 16/211; G06F 16/2474; G06F 16/248
  See application file for complete search history.

(56) References Cited

U.S. PATENT DOCUMENTS

| | | | |
|---|---|---|---|
| 5,564,872 A | 10/1996 | Veil | |
| 6,291,959 B1 | 9/2001 | Yoshida | |
| 6,421,895 B2 | 7/2002 | Muscarella | |
| 6,854,529 B2 | 2/2005 | Kuntze | |
| 7,659,681 B2 | 2/2010 | Onishi et al. | |
| 7,693,684 B2 | 4/2010 | Halbinger | |
| 8,629,641 B2 | 1/2014 | Fujishirna | |
| 9,008,822 B2 | 4/2015 | Wang et al. | |
| 9,124,212 B2 | 9/2015 | Shimoda | |
| 9,830,559 B2 | 11/2017 | Kamiya | |
| 9,956,660 B2 | 5/2018 | Koyama | |
| 10,203,686 B2 | 2/2019 | Tanabe | |
| 10,401,823 B2 | 9/2019 | Wang et al. | |
| 10,507,539 B2 | 12/2019 | Abe | |
| 2004/0217873 A1 | 11/2004 | Schweitzer | |
| 2010/0030348 A1 | 2/2010 | Scherer | |
| 2010/0204818 A1 | 8/2010 | Yamada et al. | |
| 2013/0103353 A1 | 4/2013 | Klöppner | |
| 2014/0123740 A1 | 5/2014 | Yoshikawa et al. | |
| 2014/0197770 A1 | 7/2014 | Shimoda | |
| 2017/0293862 A1 | 10/2017 | Kamiya | |

FOREIGN PATENT DOCUMENTS

| | | |
|---|---|---|
| DE | 35 01 579 | 7/1986 |
| DE | 11 2012 002 333 | 3/2014 |
| DE | 10 2016 213 152 | 2/2017 |
| EP | 1 043 118 | 10/2000 |
| JP | 63-040910 | 2/1988 |
| JP | 5-120582 | 5/1993 |
| JP | 5-150818 | 6/1993 |
| JP | 11-129147 | 5/1999 |
| JP | 2004-265034 | 9/2004 |
| JP | 2005-332398 | 12/2005 |
| JP | 2009-122978 | 6/2009 |
| JP | 2010-262627 | 11/2010 |
| JP | 2012-84011 | 4/2012 |
| JP | 2016-200928 | 12/2016 |
| WO | 00/12259 | 3/2000 |

OTHER PUBLICATIONS

Office Action dated Sep. 4, 2020 in German Patent Application No. 102018210874.9.
Notifications of Reasons for Refusal dated May 7, 2019 in corresponding Japanese Patent Application No. 2017-138948.
Notification of Reasons for Refusal dated Jun. 18, 2019 in corresponding Japanese Patent Application No. 2017-138948.
Office Action dated Jul. 16, 2020 in corresponding Chinese Patent Application No. 201810763268.9.

FIG. 1

INFORMATION COLLECTION DEVICE AND INFORMATION COLLECTION METHOD

This application is based on and claims the benefit of priority from Japanese Patent Application No. 2017-138948, filed on 18 Jul. 2017, the content of which is incorporated herein by reference.

BACKGROUND OF THE INVENTION

Field of the Invention

The present invention relates to an information collection device and information collection method which collect information about a device having a drive unit.

Related Art

A machine tool includes a drive unit such as a motor, and performs predetermined machining by driving this drive unit. In addition, the machine tool includes many mechanical components and electrical components in addition to the driven unit. These mechanical components and electrical components are consumed and break in response to operating accompanying the driving of the drive unit. Therefore, in the case of using a machine tool, it is necessary to perform maintenance periodically, and replace the mechanical components and electrical components which have been consumed or broken with normal mechanical components and electronic components.

An example of technology related to maintenance on such a machine tool is disclosed in Patent Document 1. In the technology disclosed in Patent Document 1, mainly the matter of collecting information related to the tool of the machine tool and constructing a database, and the matter of providing the data accumulated in the database to the tool maker are disclosed.

Patent Document 1: PCT International Publication No. WO00/12259

SUMMARY OF THE INVENTION

The technology disclosed in Patent Document 1 describes the matter of understanding the use tendency of the tool, etc. by the tool maker statistically analyzing the data accumulated in the database. However, it is desired to more practically use the individual sets of data accumulated in the database, and not only statistically use the data accumulated in the database in this way.

Therefore, the present invention has an object of providing an information collection device and information collection method capable of collecting information from a management target device having a drive unit such as a machine tool, and more practically using the information thus collected.

An information collection device (for example, the information collection device 10 described later) according to a first aspect of the present invention includes: a collection unit (for example, the collection unit 11 described later) which collects, from a management target device (for example, the first machine tool 41 . . . $n^{th}$ machine tool 4n described later) including a drive unit, operating state information which is information indicating an operating state of the management target device while operating accompanying movement of the drive unit; and a comparison unit (for example, the comparison unit 14 described later) that extracts, from the operating state information thus collected, a plurality of sets of information which match in a predetermined condition, and outputs a comparison result of the plurality of sets of information thus extracted.

According to a second aspect of the present invention, the information collection device as described in the first aspect may be configured so that the comparison unit outputs a comparison result between the operating state information of a first period, and the operating state information of a second period for one management target device.

According to a third aspect of the present invention, the information collection device as described in the first aspect may be configured so that the comparison unit outputs a comparison result of the operating state information for each of a plurality of management target devices.

According to a fourth aspect of the present invention, the information collection device as described in the first aspect may be configured so that the comparison unit outputs a comparison result between the operating state information serving as a reference and the operating state information thus collected.

According to a fifth aspect of the present invention, the information collection device as described in any one of the first to fourth aspects may be configured so that the collection unit collects, as operating state information, information indicating a driving state of the drive unit while operating accompanying movement of the drive unit.

According to a sixth aspect of the present invention, the information collection device as described in any one of the first to fifth aspects may be configured so that the collection unit collects, as operating state information, information indicating input/output timing of a signal from an external device which inputs and outputs the signal in relation to the management target device, while operating accompanying movement of the drive unit.

According to a seventh aspect of the present invention, the information collection device as described in any one of the first to sixth aspects may be configured so that the predetermined condition is being information of management target devices operating based on programs which are the same.

According to an eighth aspect of the present invention, the information collection device as described in any one of the first to seventh aspects may be configured so that the management target device is a machine tool for performing machining on a workpiece, and the collection unit collects the operating state information in a case of causing the management target device to operate accompanying movement of the drive unit without performing machining of a workpiece.

An information collection method according to a ninth aspect of the present invention which is performed by an information collection device (for example, the information collection device 10 described later) includes the steps of: collecting, from a management target device (for example, the first machine tool 41 . . . $n^{th}$ machine tool 4n described later) having a drive unit, operating state information which is information indicating an operating state of the management target device while operating accompanying movement of the drive unit; and extracting a plurality of sets of information which match in a predetermined condition from the operating state information thus collected, and outputting a comparison result of the plurality of sets of information thus extracted.

According to the present invention, it is possible to collect information from a management target device having a drive unit such as a machine tool, and more practically use this collected information.

DETAILED DESCRIPTION OF THE INVENTION

Configuration of Overall Embodiment

Figure 1:
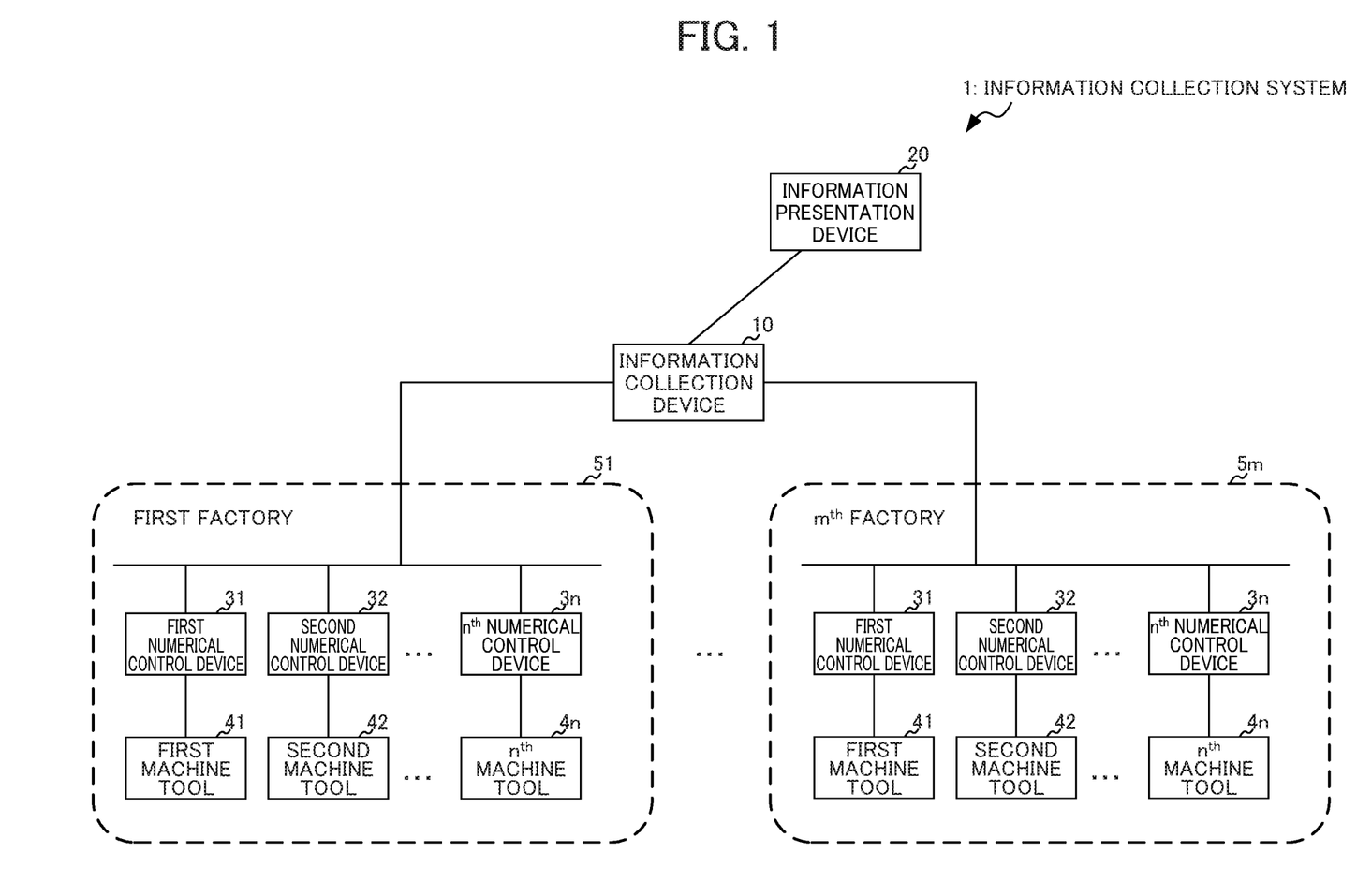
FIG. 1 is a block diagram representing a basic configuration of an overall information collection system which is an embodiment of the present invention.

First, the configuration of an information collection system 1 according to the present embodiment will be explained. The information collection system 1 includes an information collection device 10, information presentation device 20, and a plurality of factories (corresponding to first factory 51 ... $m^{th}$ factory 5m in the drawing), as shown in FIG. 1. In addition, each factory includes n number of machine tools (corresponding to first numerical control device 31 ... $n^{th}$ numerical control device 3n in the drawing), and n number of numerical control devices (corresponding to first machine tool 41 ... $n^{th}$ machine tool 4n in the drawing). It should be noted that n and m in the reference symbols are any natural number. In addition, the value of n may differ for every factory. In other words, the numbers of factories and devices can be arbitrarily decided in the present embodiment.

The information collection device 10 and information presentation device 20 are communicably connected. In addition, the information collection device 10 is also communicably connected to the respective numerical control devices in each factory. Furthermore, each numerical control device and each machine tool are made into one-to-one groups, and are communicably collected. These communications may be performed directly without going through a relay or the like, or may be through a network including a relay. Network is realized by a LAN (Local Area Network) constructed within a factory, and/or VPN (Virtual Private Network) constructed on the Internet.

The information collection device 10 is a device that collects information indicating the operating state of each machine tool, while operating accompanying movement of the drive unit (motor) of each machine tool included in the information collection system 1. Hereinafter, the information indicating the operating state of each machine tool collected by this information collection device 10 is called "operating state information". In addition, the information collection device 10 constructs a database based on the collected operating state information, and compares the operating state information in the constructed database based on predetermined conditions. Then, the information collection device 10 presents the comparison results to the user.

In the present embodiment, it is possible to compare the collected operating state information, and present the comparison results thereof to the user. In other words, the present embodiment exerts an effect in making possible to collect information from management target device having a drive unit such as a machine tool, and more practically use this collected information.

The information presentation device 20 is a device for presenting comparison results by the information collection device 10 to the user. In the present embodiment, the presentation may be performed by the information collection device 10, or may be performed by the information presentation device 20. It should be noted that detailed configurations of the information collection device 10 and information presentation device 20 will be described later by referencing FIG. 2.

Each numerical control device is a NC (Numerical Control) device realizing predetermined machining based on a machining program by controlling the driving of the drive unit (motor) of each machine tool. Each numerical control device controls the drive unit of each machine tool according to feedback control.

In addition, each numerical control device acquires operating state information in parallel with this control. The acquired operating state information, for example, is motor control data of the spindle and feed axis along a time series. More specifically, it is a command value for motor current, measured value of motor current, command value for motor rotation speed, measured value for motor rotation speed, measured value for motor torque, etc. along a time series.

It should be noted that this data is merely an exemplification, and may additionally establish a position command included in the operation command outputted to the machine tool, and information related to feedback control as operating state information. For example, the position feedback, and/or positional error arrived at by subtracting the position feedback from the position command, etc. may be established as operating state information. In addition, signals inputted and outputted from external equipment to the numerical control device may be established as operating state information. For example, in order to perform sequence control on the machine tool, signals written in a language called ladder language (hereinafter called "PMC signal") may be established as operating state information.

Furthermore, a vibration sensor and/or temperature sensor may be installed directly or in the vicinity of the numerical control device and/or machine tool, and the measured values of this sensor may be established as operating state information. In addition, the characteristics such as the supply voltage to the machine tool (for example, voltage, frequency, voltage fluctuation, etc.) may be established as operating state information. In addition, even in the case of establishing any information as operating state information, it is sufficient if establishing as information along a time series.

It should be noted that it is configured so as to also include information indicating the attributes of the operating state information in the operating state information. For example, as information indicating the attributes of the operating state information, it is configured to include the data acquisition date/time, a machining program used for driving the machine tool, machine number of the machine tool, number and ID of workpiece serving as the target of machining, etc. It should be noted that the work ID may be information such as a symbol or barcode (also including two-dimensional barcode), for example.

Each machine tool is a device that executes predetermined machining such as cutting by operating according to the control of the numerical control device. Each machine tool includes a drive unit such as a servomotor and linear motor for driving a workpiece serving as the machining target and a tool which performs machining. It should be noted that, since the configurations and functions of the numerical control device and machine tool are well known to those skilled in the art, detailed explanations thereof will be omitted.

<Functional Blocks Equipped to Information Collection Device 10 and Information Presentation Device 20>

Figure 2:
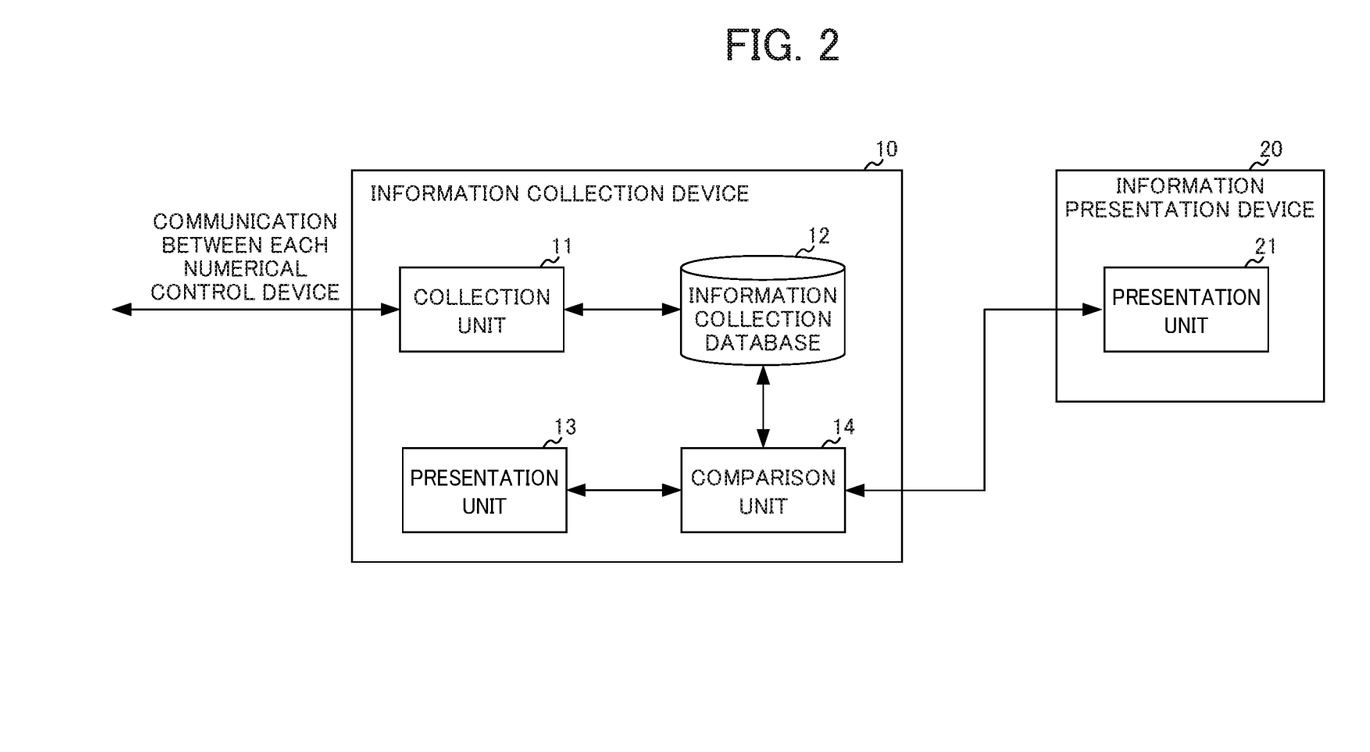
FIG. 2 is a block diagram representing a basic configuration of an information collection device and an information presentation device of the embodiment of the present invention.

Next, an explanation will be made by referencing FIG. 2 for the functional blocks equipped to the information collection device 10 and information presentation device 20. The information collection device 10 includes a collection unit 11, information collection database 12, presentation unit 13 and comparison unit 14. In addition, the information presentation device 20 includes a presentation unit 21.

The collection unit 11 is a portion that collects operating state information. The collection of operating state information by the collection unit 11 is performed at predetermined periods. For example, it is performed in periods of one time per several hours, or one time per day. The collection is performed by each of the numerical controllers spontaneously sending operating state information to the collection unit 11 in the case of the period arriving. In addition, it may be configured not in this way, but rather so that the collection unit 11 requests operating state information to each numerical control device in the case of the period arriving, and each numerical control device sending the operating state information to the collection unit 11 as a response to this request.

In addition, if each numerical control device of each factory sends operating state information in unison at the same timing, there is a possibility of the communication line being congested. Therefore, it is good to configure so as to make the periods for performing collection different for every factory, or every numerical control device.

The information collection database 12 is a database which accumulates operating state information collected by the collection unit 11. The collection unit 11 stores the collected operating state information along a time series for every (machine tool correspond to) numerical control device that is a collection source.

The presentation unit 13 is a portion for presenting the operating state information itself and/or the comparison results of operating state information to the user. The present embodiment not only presents simply the operating state information included in the information collection database 12, but also presents the comparison results of a plurality of sets of operating state information included in the information collection database 12, as mentioned above.

It should be noted that the presentation unit 13 also has a function of accepting operations from a user. Operations from a user are operations for performing a presentation request made by designating the comparison targets and/or comparison method by the comparison unit 14, for example. The operation contents accepted by the presentation unit 13 are notified to the comparison unit 14. The user can perform a presentation request for desired comparison results, by performing an operation. For example, the user performs a presentation request for desired comparison results, by designating the desired factory wanted to reference for comparison results (for example, first factory 51), the desired information to serve as the comparison target (for example, command value for motor current), and time period wanted as comparison target (start/finish of time period). The comparison unit 14 performs comparison in response to this presentation request of the user, and causes the comparison results thereof to be presented on the presentation unit 13.

The presentation unit 13 is realized by a display for displaying comparison results of operating state information, and/or a printer for printing out comparison results, a mouse and/or keyboard for performing operations, etc. It should be noted that it may be configured so as to realize the presentation unit 13 by way of a device such as a touch panel.

The comparison unit 14 is a portion that performs comparison of a plurality of sets of operating state information included in the information collection database 12. The comparison results by the comparison unit 14 are outputted to the presentation unit 13. The comparison unit 14, for example, performs comparison based on the presentation request from the user accepted by the presentation unit 13 as mentioned above, and outputs the comparison results thereof to the presentation unit 13. Then, the presentation unit 13 presents the comparison results inputted from the comparison unit 14 to the user. The detailed contents of comparison by the comparison unit 14 will be described later by referencing FIG. 3. In addition, the detailed contents of presentation by the presentation unit 13 will be described later by referencing FIG. 4.

The presentation unit 21 is a portion having equivalent functions to the aforementioned presentation unit 13. Since an explanation of the presentation unit 21 is made by replacing the wording of presentation unit 13 in the aforementioned explanation with presentation unit 21, redundant explanations will be omitted.

It should be noted that each of the aforementioned functional blocks is a portion especially related to the present embodiment, and the information collection device 10 and information presentation device 20 include general functional blocks such as functional blocks for performing communication, for example, in addition to the aforementioned functional blocks.

The aforementioned information collection device 10 and information presentation device 20 can be realized by incorporating programs unique to the present embodiment (for example, application programs) in a general server device or personal computer. When explaining in further detail, each of the aforementioned information collection device 10 and information presentation device 20 include an arithmetic processing unit such as a CPU (Central Processing Unit). In addition, each of the aforementioned information collection device 10 and information presentation device 20 includes an auxiliary storage device such as a HDD (Hard Disk Drive) or SSD (Solid State Drive) storing various control programs, and a main storage device such as RAM (Random Access Memory) for storing data which is temporarily necessitated upon the arithmetic processing unit executing programs.

Then, in each of the aforementioned information collection device 10 and information presentation device 20, the arithmetic processing unit reads various programs from the auxiliary storage device, and performs arithmetic processing based on these various programs while expanding the read various programs in the main storage device.

The functions of the aforementioned various functional blocks are realized by controlling the hardware equipped to each of the information collection device 10 and information presentation device 20 based on the arithmetic results thereof. In other words, the information collection device 10 and information presentation device 20 can be realized by hardware and software cooperating.

<Comparison by Comparison Unit 14>

Figure 3:
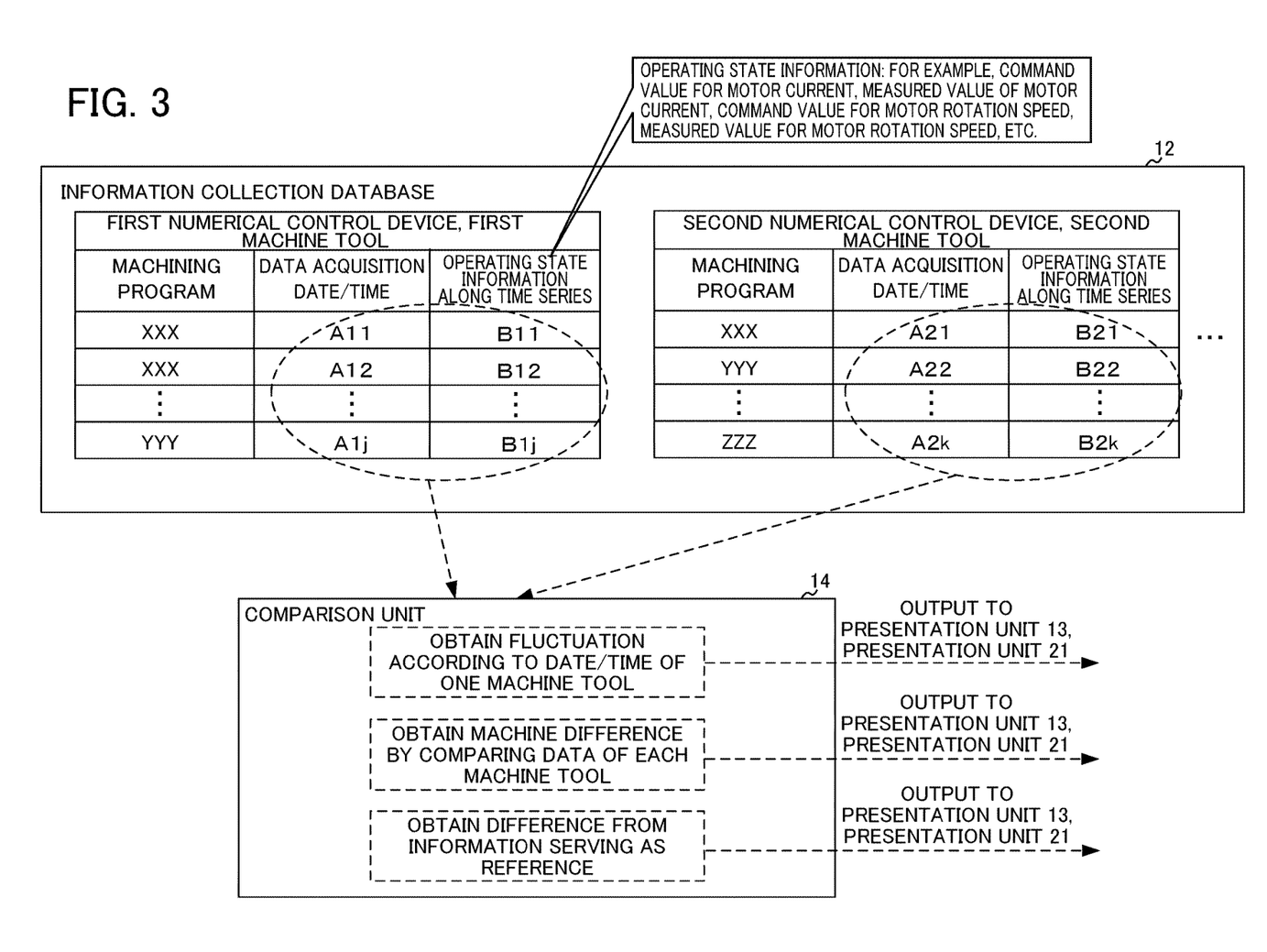
FIG. 3 is a conceptual diagram showing an example of a data structure in the embodiment of the present invention.

Next, an explanation will be made by referencing FIG. 3 for comparison of operating state information by the comparison unit 14. The operating state information collected by the collection unit 11 is stored along a time series for every (machine tool corresponding to) numerical control device that is a collection source in the information collection database 12. In addition, the type of machining program used in operating is also stored as an attribute in the example of FIG. 3.

The comparison unit 14 extracts sets of the operating state information serving as comparison targets based on the operation from the user, etc. Then, the extracted sets of operating state information are compared. Herein, the comparison unit 14, as a general rule, extracts and compares information sets at which operating with the same machining program, and performing the same machining (i.e. workpieces that are the machining target, and/or tools used in machining are the same).

However, in this case, comparison of machine tools not performing the same machining is not possible. Therefore, for machine tools operating with the same machining program, but the same machining not being performed, it is sufficient to configure so as to perform the same movements by idling not accompanied by machining on the workpiece. If configuring in this way, it is possible to collect operating state information at the same conditions, irrespective of whether or not the workpiece that is the machining target and/or the tool used in machining are the same. For this reason, it becomes possible to extract and compare sets of operating state information for machine tools operating with the same machining program, but the same machining not being performed. For this idling, it is sufficient to configure so that the user causes the machine tool to perform, as a part of daily inspection for collecting operating state information.

As the specific comparison method of the comparison unit 14, for example, the comparison unit 14 extracts and compares sets of operating state information at different dates/times of one machine tool (i.e. same individual machine), and outputs the difference between the compared operating state information as a comparison result. This corresponds to "obtain fluctuation according to date/time of one machine tool" indicated in the drawing. Herein, there are considered to be various main causes for fluctuation to occur according to date/time.

For example, when looking long-term, aging of the drive unit can be considered. In addition, as an example considered of a little shorter-term, the influence of fluctuations in input voltage can be considered. For example, when many machine tools are running, and a great voltage drop occurs, the behavior may change. In addition, as another example, the influence of noise can be considered. For example, when a device generating noise in the surroundings is running, the operation may vary by the influence of this noise.

Therefore, in the case of there having been an event in which the behavior became strange in unison in a plurality of machine tools at a certain date/time, the influence appeared in the machined workpiece, etc., the fluctuation according to date/time of one machine tool is obtained by employing the present embodiment. The user can thereby perform analysis, etc. of the cause for an event.

In addition, otherwise, the comparison unit 14 extracts and compares sets of the operating state information of each of a plurality of machine tools, and outputs the differences between compared sets of operating state information as a comparison result. This corresponds to "obtain machine difference by comparing data of each machine tool" indicated in the drawing. In this case, if being machine tools of different machine type, even if operating under the same machining program, the operating state information often differs. For this reason, normally, sets of operating state information of different individual machines of the same machine type are defined as comparison targets. It should be noted that it may be configured so as to compare a set of the operating state information of a certain machine tool and the average for sets of operating state information of a plurality of machine tools other than this machine tool.

However, regarding the position feedback data upon performing position control, even if different machine types, so long as the machining program is the same, they will not differ so much. In such a case, it may be configured so as to define sets of operating state information for different types of machines as the comparison target.

The main cause for differences to occur for individual machines, in addition to differences in the machines from the start (for example, torsional characteristic, backlash characteristic, friction characteristic, etc. of machine), is aging degradation. The user can make so a machine tool to serve as a maintenance target is specified by obtaining the machine difference by comparing the data of respective machine tools employing the present embodiment.

In addition, otherwise, the comparison unit 14 prepares operating state information in advance to be a reference, extracts and compares the operating state information of any machine tool with the operating state information serving as this reference, and outputs the difference of compared sets of operating state information as a comparison result. This corresponds to "obtain difference from information serving as reference" indicated in the drawing. As the operating state information serving as the reference, it is sufficient to define the operating state information of a machine tool which is running normally, for example, as the operating state information serving as reference.

The user can specify the machine tool to be defined as a maintenance target, also by obtaining the difference from the information serving as reference by employing the present embodiment. It should be noted that these comparison results are outputted to the presentation unit 13 and/or presentation unit 21, respectively, and presented to the user with the presentation unit 13 and/or presentation unit 21, as shown in FIG. 3.

<Presentation by Presentation Unit 13 and Presentation Unit 21>

Figure 4:
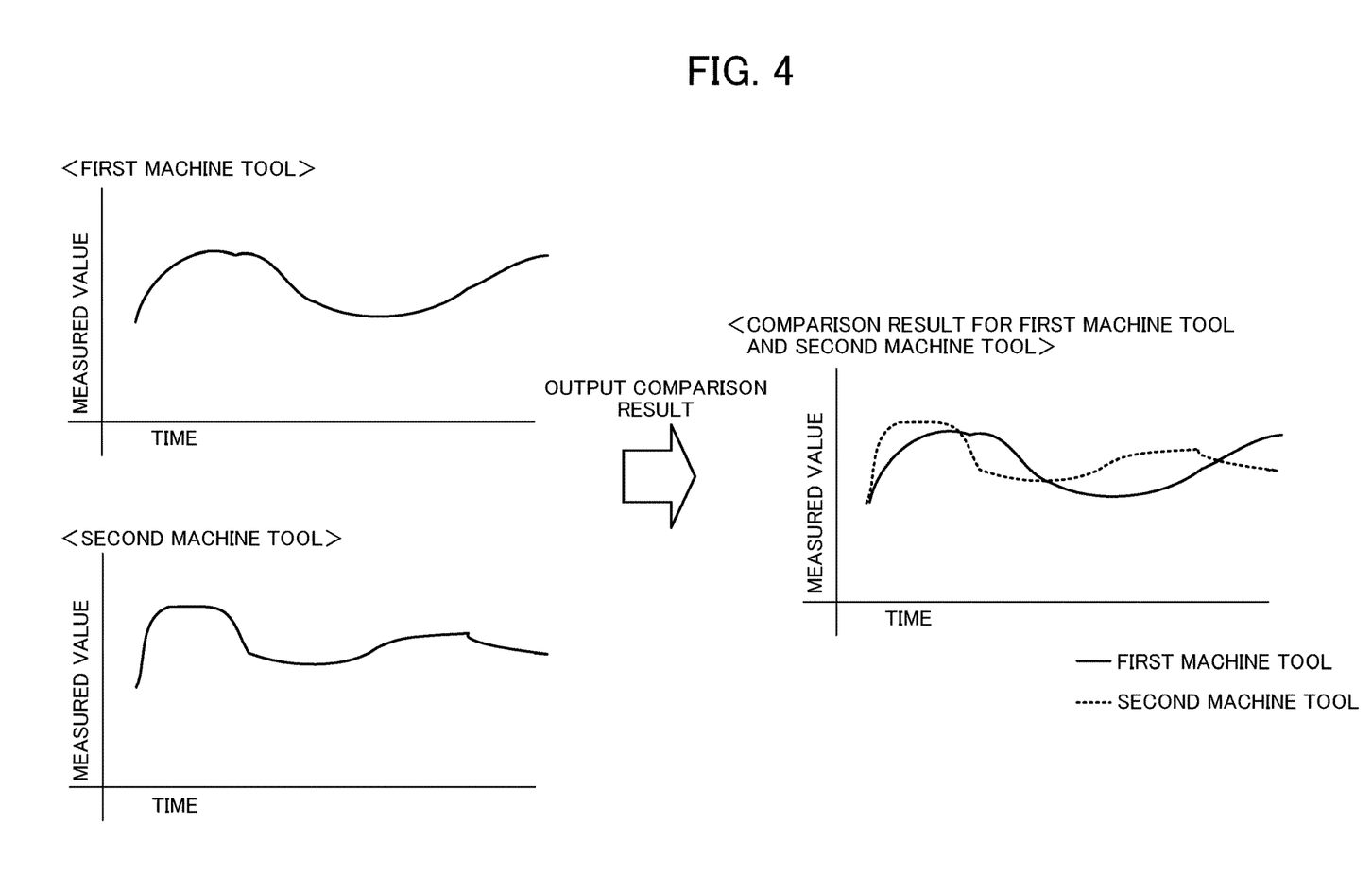
FIG. 4 is a conceptual diagram showing an example of the output of a comparison result in the embodiment of the present invention.

Next, an explanation will be made by referencing FIG. 4 for the output of comparison results performed on the presentation unit 13, and/or presentation unit 21. As mentioned above, comparison is performed based on the desired conditions designated by the user, and the comparison results are displayed, etc. on the presentation unit 13 and/or presentation unit 21. The user can obtain the desired information by referencing this.

Herein, the comparison unit 14 outputs the difference of the compared sets of operating state information as the comparison result. For example, in the case of the operating state information being certain measured values, the difference between the measured value of the first machine tool 41 and the measured value of the second machine tool 42 is outputted as the comparison result. It is sufficient to configure so that the comparison result is outputted as a flag along a time series as shown in FIG. 4. For example, a case of the measured value of the first machine tool 41 and the measured value of the second machine tool 42 being flags such as those shown on the left in FIG. 4 is considered. In this case, it is sufficient to configure so that the comparison unit 14 outputs the flags for the measured values of the two machine tools to overlap.

The user referencing this output result can visually grasp the difference between the measured value of the first machine tool 41 and the measured value of the second machine tool 42. It should be noted that, although the measured value of the first machine tool 41 and the measured value of a different machine tool referred to as the measured value of the second machine tool 42 are compared, this is an example. Measured values of different dates/times of the same machine tool may be compared and outputted as shown in FIG. 4, or measured values of a certain machine tool and measured values serving as reference may be compared and outputted as shown in FIG. 4.

Furthermore, rather than realizing a difference by outputting measured values to overlap in this way, it may realize a difference by another method. For example, the difference may be realized by the maximum value for the absolute value of difference between measured values, average value of difference between measured values, square mean value of difference between measured values, average value for absolute value of difference between measured values, etc. In this case, it may be configured so as to output the difference realized in this way with a flag along a time series. In addition, otherwise, it may be configured so as to realize a difference by the integrated value for the absolute value of difference between measured values, and integrated value for the square of the absolute value of difference between measured values.

Operation of Present Embodiment

Figure 5:
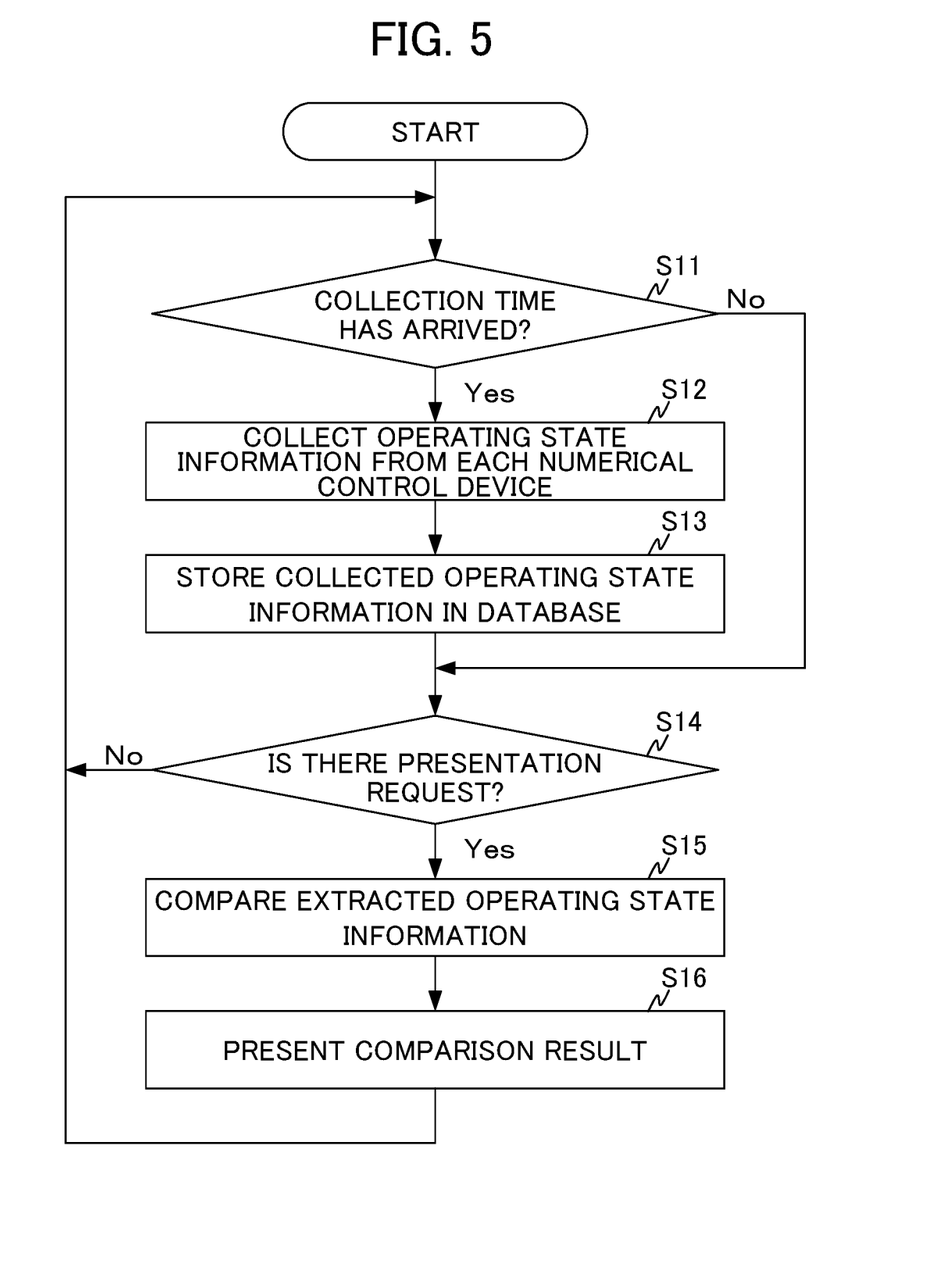
FIG. 5 is a flowchart showing the basic operations of the embodiment of the present invention.

Next, an explanation will be made by referencing the flowchart of FIG. 5 for operations of the present embodiment. In Step S11, the collection unit 11 determines whether a predetermined period has elapsed, and the time for collecting operating state information has arrived. In the case of the time for collecting operating state information still not arriving, it is determined as NO in Step S11, and the processing advances to Step S14. On the other hand, in the case of the time for collecting operating state information having arrived, it is determined as YES in Step S11, and the processing advances to Step S12.

In Step S12, the collection unit 11 collects the operating state information from each numerical control device.

In Step S13, the collection unit 11 stores the operating state information collected in Step S12 in the information collection database 12. By this processing, the operating state information is accumulated in the information collection database 12.

In Step S14, the comparison unit 14 determines whether or not there has been a presentation request for comparison results of operating state information, based on an operation of the user on the presentation unit 13 or presentation unit 21. In the case of there not being a presentation request, it is determined as NO in Step S14, and the processing returns to Step S11. Then, the aforementioned processing is repeated again. On the other hand, in the case of there having been a presentation request, it is determined as YES in Step S14, and the processing advances to Step S15.

In Step S15, the comparison unit 14 extracts sets of operating state information corresponding to the presentation request from the information collection database 12. Then, the comparison unit 14 compares the extracted sets of operating state information, and outputs the comparison result to the presentation unit 13 or presentation unit 21 which had accepted the presentation request.

In Step S16, the presentation unit 13 or presentation unit 21 presents the comparison result inputted from the comparison unit 14 in Step S15 to the user. Subsequently, the processing returns to Step S11. Then, the aforementioned processing is repeated again.

According to the present embodiment explained above, it is possible to compare collected sets of operating state information, and present the comparison result thereof to the user. In other words, the present embodiment exerts an effect in making it possible to collect information from management target devices having a drive unit such as a machine tool, and more practically using this collected information.

A more detailed explanation will be made for the effects of the present embodiment. The present embodiment can be employed for notifying a user of the stage of maintenance of a machine tool, and/or abnormality occurrence in a machine tool. In relation to maintenance of machines, conventionally, it is common to conduct maintenance in the case of a predetermined stage having arrived, rather than confirming the operating state information of each machine tool. In contrast, according to the present embodiment, the operating state information from an initial state in which the machine tool started operating is accumulated. For this reason, with the present embodiment, it is possible to know a more appropriate maintenance stage, due to aging of a machine tool being found easily, and comparison between respective machine tools being done easily. In particular, it is also possible for a plurality of a machine tool to be present, and perform comparison thereof easily.

In relation to the abnormality occurrence in machine tools, it has not been possible to know of abnormality when some explicit abnormality sign cannot be seen, such as an alarm being generated by the numerical control device, a sound emanating from the machine tool, or the machining precision exceeding the tolerance range. In contrast, by comparing sets of operating state information periodically employing the present embodiment, it becomes possible to know of abnormality in a machine tool prior to the above-mentioned such explicit abnormality signs appearing.

<Cooperation Between Hardware and Software>

It should be noted that each of the respective devices included in the above-mentioned information collection system can be realized by hardware, software or a combination of these. The maintenance component management method performed by each of the respective devices included in the above-mentioned information collection system can also be realized by hardware, software or a combination of these. Herein, being realized by software indicates the matter of being realized by a computer reading and executing programs.

The programs can be stored using a variety of types of non-transitory computer readable media, and supplied to the computer. The non-transitory computer readable media includes varies types of tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Modified Examples

In addition, the aforementioned embodiment is a preferred embodiment of the present invention; however, it is not to limit the scope of the present invention to only the above-mentioned embodiment, and implementation is possible in modes arrived at by conducting various modifications in a scope not departing from the gist of the present invention.

First Modified Example

For example, the aforementioned embodiment explains an example of performing processing with a machine tool or the like used in a factory as the target; however, the present embodiment may configure so as to perform processing on another target. For example, in place of the machine tool, it may be configured so as to perform processing on an industrial robot.

Second Modified Example

In addition, in the aforementioned embodiment, for example, each numerical control device sends operating state information to the information collection device 10. Modifying this, it may be configured so as to provide a management device within each factory, for example, and this management device collects the operating state information from each numerical control device, and this management device sends this collected operating state information to the information collection device 10.

Third Modified Example

In addition, for example, it may be configured so that the comparison unit 14 compares the timings of the aforementioned PMC signal. The input signal from an external device, output signal to the external device, etc. are included in the PMC signal, in addition to the signals being completed only inside the numerical control device. For example, if the workpiece is positioned at a certain position inside of the machine tool, when a certain switch is pressed, and this is transmitted to the numerical control device, the numerical control device may perform control such as starting machining. In this case, the matter of "certain switch" corresponds to an input signal inputted externally to the numerical control device.

Differences in the timings may occur in this PMC signal. For example, the PMC signal completed only within the numerical control device will run at the same timing almost every time so long as operating with the same machining program. In contrast, for the PMC signal related to an external device, the timing thereof changes when the running mode of the external device changes. There are various reasons for the timing of the external device shifting; therefore, it is often not possible to specify. However, in the case of an event arising such as a machine tool which has been running normally until now not operating normally from a certain time, by a user observing the difference in timing of the PMC signal, it is possible to known the operation of the external device changing, and the timing of this PMC signal shifting is the main cause of event occurrence.

Fourth Modified Example

In the case of including the ID, etc. of a workpiece serving as the machining target in the operating state information as mentioned above, it may be configured so as to output the operating state information based on a quality determination of this workpiece. Generally, the finished product of the machined workpiece is inspected, and quality determination thereof is performed. With a machine tool having machined a workpiece determined as a defective product, the possibility of something working differently from normal at the location at which the defect occurred is high. In such a case, when confirming the operating state information of this machine tool, it is possible to investigate the reason for which such running occurred, and for example, it is possible to perform isolation into causes on the machine side, causes on the control side, etc.

For example, if it is after reaching a state such that many defective products were made by a certain machine tool, it is considered easy to investigate the causes thereof. However, when a situation in which only one defective product was made among a large number, investigating the cause thereof is generally difficult. However, according to the present embodiment, it becomes possible to seek the cause thereof by specifying the operating state information upon the defective product being made, and comparing with operating state information when the defective product was not made.

EXPLANATION OF REFERENCE NUMERALS

1 information collection system
10 information collection device
11 collection unit
12 information collection database
13 presentation unit
14 comparison unit
21 presentation unit
31 first numerical control device
32 second numerical control device
3$n$ $n^{th}$ numerical control device
41 first machine tool
42 second machine tool
4$n$ $n^{th}$ machine tool
51 first factory
5$m$ $m^{th}$ factory

What is claimed is:

1. An information collection device comprising:
   a memory configured to store a program; and
   a processor configured to execute the program and control the information collection device to:
   collect, from a management target device including a drive unit, as operating state information which is information indicating an operating state of the management target device while operating accompanying movement of the drive unit, a result of quality determination of a workpiece machined by the management target device at least while operating accompanying movement of the drive unit; and
   extract, from the operating state information thus collected, a plurality of sets of information which match in a predetermined condition based on at least the result of the quality determination of the workpiece, and output a comparison result of the plurality of sets of information thus extracted.

2. The information collection device according to claim 1, wherein the processor is further configured to execute the program and control the information collection device to output a comparison result between the operating state information of a first period, and the operating state information of a second period for one management target device.

3. The information collection device according to claim 1, wherein the processor is further configured to execute the program and control the information collection device to output a comparison result of the operating state information for each of a plurality of management target devices.

4. The information collection device according to claim 1, wherein the processor is further configured to execute the program and control the information collection device to output a comparison result between the operating state information serving as a reference and the operating state information thus collected.

5. The information collection device according to claim 1, wherein the processor is further configured to execute the program and control the information collection device to collect, as operating state information, information indicating a driving state of the drive unit while operating accompanying movement of the drive unit.

6. The information collection device according to claim 1, wherein the processor is further configured to execute the program and control the information collection device to collect, as operating state information, information indicating input/output timing of a signal from an external device which inputs and outputs the signal in relation to the management target device, while operating accompanying movement of the drive unit.

7. The information collection device according to claim 1, wherein the management target device is one of a plurality of management target devices, and the predetermined condition is information of the management target devices operating based on programs which are the same.

8. The information collection device according to claim 1, wherein the management target device is a machine tool for performing machining on a workpiece, and
wherein the processor is further configured to execute the program and control the information collection device to collect the operating state information in a case of causing the management target device to operate accompanying movement of the drive unit without performing machining of a workpiece.

9. An information collection method performed by an information collection device, the method comprising the steps of:
collecting, from a management target device including a drive unit, as operating state information which is information indicating an operating state of the management target device while operating accompanying movement of the drive unit, a result of quality determination of a workpiece machined by the management target device at least while operating accompanying movement of the drive unit; and
extracting, from the operating state information thus collected, a plurality of sets of information which match in a predetermined condition based on at least the result of the quality determination of the workpiece, and outputting a comparison result of the plurality of sets of information thus extracted.

* * * * *